Figure 1:
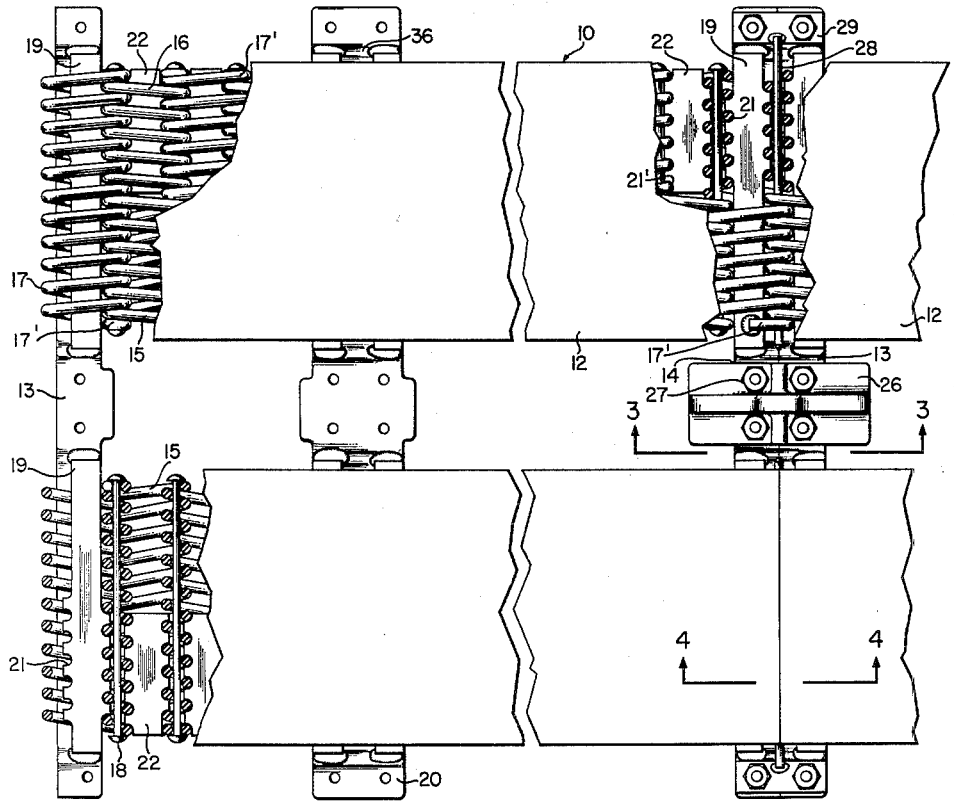

Jan. 30, 1962     O. M. LONG     3,019,062

TRACTOR TRACK

Filed Sept. 24, 1958     2 Sheets-Sheet 1

OMER M. LONG
INVENTOR.

BY Thomas J. Holden
ATTORNEY

United States Patent Office 3,019,062
Patented Jan. 30, 1962

3,019,062
TRACTOR TRACK
Omer M. Long, Frederick, Md., assignor to Aircraft Armaments, Inc., Cockeysville, Md., a corporation of Maryland
Filed Sept. 24, 1958, Ser. No. 763,031
27 Claims. (Cl. 305—37)

This invention relates in general to tractor tracks, and in particular to a flexible track unit which is particularly resistant to side loads.

Tracks of this general type are used extensively for armed vehicles and for heavy industrial and agricultural vehicles. The tractive efforts of such vehicles impose forces acting along the longitudinal axis of the tracks subjecting the same to tensile stresses. However, as a vehicle traverses rough terrain, or executes turning maneuvers by causing one track to move with respect to the other, various external lateral forces or side loads are applied which tend to cause deflection of the track parallel to the plane thereof, and twisting of the track about its longitudinal axis. Such external forces subject the track to compressive, shear and torsional stresses in addition to tensile stresses. To operate satisfactorily, a track must be able to resist these stresses without excessive deflection.

Heretofore, it has been customary to use steel track units pinned together to form an articulated track which is highly resistant to external lateral loads. Such tracks are costly to produce, however, and have the distinct disadvantage of being heavy, adding to the vehicle weight, and difficult to handle, particularly in the field when replacement of the whole track or a unit thereof is required.

In attempts to lighten the tracks, those skilled in the art have devised articulated rubber tracks having an interior reinforcement of chain links, stranded cable, or the like, attached to rigid connection members. When the rigid connection members of such track units are attached to form an articulated rubber track, the reinforcement serves to take tension loads off the rubber cover. However, in any track subjected to lateral or side loads, there is a tendency for the track to bend in the plane thereof. This tendency imposes a tension stress in the fibers of the track remote from the center of curvature and a compressive stress in the fibers closest to the center. While the reinforcing of a track of the class described can satisfactorily carry tensile stress, it lacks any appreciable ability to resist compressive stress. As a result, substantial lateral deflection of the track takes place, and such track is quite likely to be pulled from the drive wheels thereby disabling the vehicle. Lateral loads have heretofore been compensated for only by incorporating additional elements external to the track reinforcing, which elements are subject to damage and add to the weight and complexity of the track. Furthermore, in tracks of the class described, the joint formed by the abutting faces of the adjacent rubber covers tends to be opened as the covers are flexed upon engagement around the traction wheel of a vehicle, so that stones, dirt and the like are apt to be picked up and carried by the track seriously affecting its ability to function properly after a period of time.

Much effort has been expended to contribute a track of the class described in which the reinforcement does not adversely affect performance of the track in the manner set forth, and in which the joint formed between adjacent units does not suffer from the defects of the kind described, but so far as is known, no successsful track of the class described has yet been contributed to the art, and the problems here outlined remain unsolved. It is an object of this invention to contribute a track of the class described, and relying on interior reinforcement only, in which neither external side loads imposed on the track, nor flexing of the rubber cover present real obstacles to reliable performance of the track.

As a feature of this invention whereby the objects thereof are attained, the reinforcement contained within the rubber cover is made from helically wound springs, lying transverse to the longitudinal axis of the track, which springs are linked together to form a unit. The coils of these springs apparently act as leaf springs in response to side loads on the track unit acting along the axis of the springs.

As a further feature of this invention whereby additional resistance to side loads is attained, space plates are inserted within the coils of the springs to prevent collapse of a spring into an adjacent spring when compressive loads are set up in the track by side loads applied thereto.

As a still further feature of this invention, the reinforcement contained within the rubber cover of one unit is adapted to be connected directly to that of an adjacent link so that a tight joint is formed at the abutting rubber faces of adjacent links. With this arrangement, there is little opportunity for foreign matter to enter the joint as the rubber covers are flexed under load, or on passing around the traction wheels of the vehicle, since the faces are held in abutting contact by all the tension in the track. It has been found by actual trial that a track constructed in accordance with the teachings of this invention is inexpensive and weighs less than half that of an equivalent steel, pinned track, and a vehicle equipped with such a track can maneuver readily without encountering the extreme difficulties of vehicles equipped with prior art devices.

The more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claims appended hereto. Those skilled in the art will appreciate that the conception upon which this disclosure is based may readily be utilized as a basis for designing other structures for carrying out the several purposes of this invention. It is important, therefore, that the claims to be granted herein shall be of sufficient breadth to prevent the appropriation of this invention by those skilled in the art.

Figure 2:
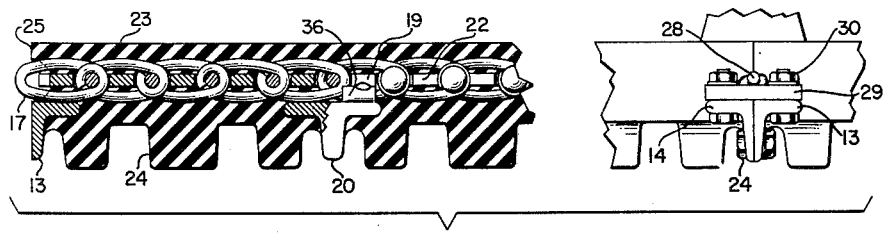
Figure 3:
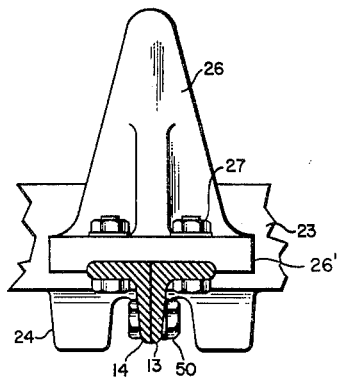
Figure 4:
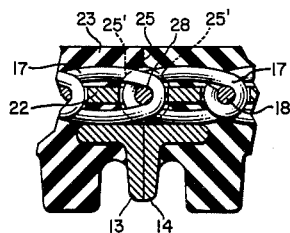
Figure 5:
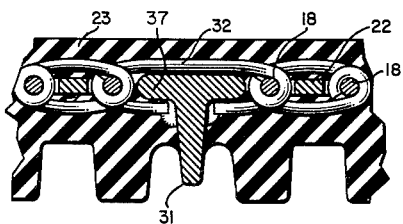
Figure 6:
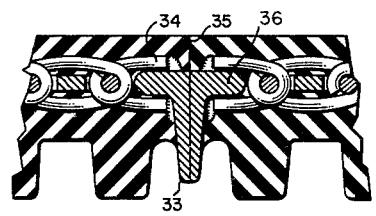

Referring now to the drawings:
FIGURE 1 is a plan view of the track, portions being broken away and portions shown in section.
FIGURE 2 is a side view of the track, portions being broken away.
FIGURE 3 is a sectional view taken on line 3—3 of FIGURE 1.
FIGURE 4 is a sectional view taken on line 4—4 of FIGURE 1.
FIGURE 5 is a sectional view of an alternate construction.
FIGURE 6 is a sectional view similar to FIGURE 4 of the alternate construction.

Referring now more particularly to the drawing, the track in which the invention is embodied is indicated generally at 10 and can be associated with a conventional track laying vehicle having a drive sprocket. Track 10 is formed of a plurality of units 12, all of which are identical, so that only one need be described in detail.

Track unit 12 has transversely extending rigid split grouser bars 13, 14 at each end interconnected by two spaced chain meshes 15. Bars 13, 14 extend beyond the edges of meshes 15. Each mesh 15 is made up of a plurality of flattened coiled left-hand springs 16 and a plurality of flattened coiled right-hand springs 17, the axes thereof lying parallel to bars 13, 14. The opening between coils of the springs is substantially equal to the size of the wire out of which the springs are formed. The mesh shown is formed with a right-hand coil 17 at each end, with alternating left and right-hand coils between. By interengaging the coils of adjacent springs, pins 18 link the springs together. Grouser bars 13, 14 are attached to the mesh by inserting connector bars 19 within the springs at each end of the mesh and welding or otherwise attaching them to bars 13, 14. As seen in FIGURE 1 all the right-hand springs 17 have closed ends 17' attached to pins 18 except the outer springs which have closed ends welded at 17' or otherwise attached to connector bar 19.

Grouser bars 20 may be connected to mesh 15 by additional connector bars 19 in a manner similar to which grouser bars 13, 14 are connected to mesh 15 by bars 19. The number of additional grouser bars 20 depends upon the length of the unit, and does not affect the essence of the invention. Connector bars 19 are flat strips of a width sufficient to substantially fill the space between the edges of the interengaged coils, and may be notched or grooved at 21 along the edges adjacent one end to fit around the coils as shown in FIGURE 1. Intermediate grouser bars 13, 14 and 20, are spacer bars 22 similar to but shorter than connector bars 19. The purpose of these spacer bars will be described later, it being sufficient at this point to state merely that the notches 21' on bars 22 and notches 21 on bars 19 prevent lateral movement of the bars with respect to the springs. Connector bars 19 are spaced from the top surface of grouser bars 13, 14, 20 by a ridge 36 adjacent each end thereof. It is to ridges 36 that the connector bars are welded so that there is clearance for the lower half of the springs.

The mesh 15 described above forms a reinforcing for a rubber cover or the like at 23 which is bonded thereto in a conventional manner to form a resilient tread upon which a track laying vehicle can ride. The under or ground engaging surface of cover 23 may be ribbed as at 24, the ribs extending downwardly beyond grouser bars 13, 14 and 20 so as to hold the latter out of contact with a smooth, hard road surface, but not interfering with the ability of the grousers to engage rougher terrain and aid to the tractive effort of the vehicle. The upper or bogie wheel surface of cover 23 may be made smooth. The transverse edges of cover 23, as shown in FIGURE 4, have transverse recesses 25' therein forming spaced faces 25 aligned with the transverse edge of split grouser bars 13, 14. Recesses 25' are of a depth substantially the same as the distance springs 17 extend beyond the plane of faces 25.

Center guides 26 are mounted between spaced covers 23 on grouser bars 20 by means of bolts 27. Faces 26' are engaged by the sprockets of the driving wheel of a vehicle. The location of centerguide 26 with respect to mesh 15, is such that the line of force applied to face 26' will be in the same plane as that defined by pins 18.

In assembling units 12 together to make a continuous belt, split grouser bar 13 of one unit is abutted against split grouser bar 14 of an adjacent unit and fastened thereto by spaced bolts 50. With the split grouser bars so joined, faces 25 on one unit abut faces 25 on the adjacent unit with spring 17 of one unit projecting into recess 25' in the adjacent unit. As shown in FIGURE 4, there is a circular opening formed between the interengaged coils of the springs and into this opening a splice pin 28, similar to pins 18 is inserted. Pin 28 is welded or otherwise attached to splice pin holder 29 which is in turn attached to grousers 13, 14 by means of bolts 30. Thus, assembly or disassembly of track units is easily accomplished.

Abutting faces 25 on cover 23 as shown in FIGURE 4, form a joint enclosing splice pin 28, and since reinforcing mesh 15 lies between faces 25, the tension within the track is utilized to hold the faces 25 against separation to form a tight joint as track 10 flexes.

Since the axes of springs 16, 17 lie transverse to the track, the interengaged coils act as leaf springs in response to side loads acting on the track. Such loads are spread between many coils by virtue of the interconnection between the coils and grouser bars 19, 20 arising from the close spacing of the coils and notches 21, 21'. Further resistance to side loads which tend to bend track 10 in the plane thereof is provided by spacer bars 22, which may extend within springs 16, 17 only adjacent the outer edges of meshes 15 as viewed in FIGURE 2. On bending in one direction, the outer longitudinal edge of track 10 closest to the center of curvature is subject to compressive stress, and on bending in the opposite direction, the opposite longitudinal edge of track 10 is subject to compressive stress. Thus, both edges can be subject to compressive stress. To lighten the track, spacers 22 may be placed only in the region where compressive stress will occur, namely adjacent the free edges of track 10. As seen best in FIGURE 1, bars 19 and 22 substantially fill the space between the coils of the springs so that a substantially solid, yet flexible reinforcing is formed. The closer the fit between the bars and the links, the greater is the resistance of the links to their collapse, one into the other. Thus, relative movement of the links in a direction parallel to the longitudinal axis of the track section is effectively prevented.

In order to render the track more resistant to side loads, the metal reinforcing may be placed under a tensile stress as the rubber cover is bonded thereto. Such pre-stress will enable the track to take considerably more compressive strain without the lateral deflection which is so disastrous to reliable performance of the track. By adjusting the "flatness" of the springs, the normal pitch and the pre-stress value of each unit can be made uniform in order that a track assembled from the units be of uniform strength throughout.

While round wire springs are shown, it is contemplated that the springs could be made from stock having a square, oval or rectangular section. Such section would be particularly advantageous in the modification shown in FIGURES 5 and 6. In this modification, the mesh is connected to the split grouser 33 by a U-shaped half-link 34 welded to the top 36 of the grouser. The "flatness" of the section gives a great deal more area for welding and assures a secure connection. Whole grouser 31 intermediate the ends of a section has a top 37 upon which is welded elongated link 32 to form space for connection by pins 18 to adjacent links. In the embodiment shown in FIGURES 5 and 6, there is no tendency for the grousers to rotate about a link as in the case of the first illustrated embodiment with the result that the bond between the metal and rubber does not deteriorate. Furthermore, center guides mounted on tops 36, 37 would have their driven faces positioned such that the line of force applied thereto will remain in the plane defined by the axes of pins 18. It should be noted moreover, that tops on legs 36 of the split grousers 33 on a unit are directed toward each other to define a plane within which lies top 37 and the axes of the springs and pins.

The drawing illustrates a track having a single center guide located between two rubber covers, but it is obvious that a narrower track could be made using a single rubber-covered reinforcing mesh with guides located at the edges thereof. In such case, the spacer bars may extend completely across the width of the track. In addition, the drawing shows the splice joint as lying normal to the longitudinal axis of the track. However, it may be advantageous so far as tractive effort and additional resistance to side loads is concerned, to modify the track by maintaining the joint transverse to the track but inclined with respect to the longitudinal axis. In such case, a track having spaced covers may have a V shape with one side with a joint inclined in one direction and the other side with a joint inclined in the opposite direction with the center guide lying along the longitudinal axis of the track.

Those skilled in the art will appreciate that the invention is such as to provide a track of the class described which has a reinforcing composed of simple parts that enables a vehicle to successfully maneuver over rough terrain without the difficulties inherent in present tracks. It is believed that the complete utility and value of this invention, as well as its great simplicity will now be understood and appreciated by those skilled in the art.

I claim:

1. A track unit for use in an endless track comprising a transversely extending rigid bar positioned at each end of said unit, a plurality of helically wound wire links between each rigid bar, means to connect the links at each end to the rigid bar thereat, means to connect intermediate adjacent links together whereby said links connect the rigid bars together, and a body of rubber composition encasing said links and a portion of said bars, said bars adapted to be connected to adjacent bars on another unit to form an endless track.

2. The device of claim 1 wherein said links are provided with means to prevent relative movement between said links.

3. The device of claim 2 wherein said last named means comprise plates inserted within the links, and means are provided thereon which cooperate with the links whereby relative movement between said plates and links is prevented.

4. The device of claim 1 wherein there is provided on the links at each end, means for connecting the links at each end to links on an adjacent unit to form an endless track, said last named means including a removable pin.

5. The device of claim 1 wherein there is provided on the links at each end, means for connecting the links at each end to links on an adjacent unit to form an endless track.

6. A track unit for use in an endless track comprising a transversely extending rigid bar positioned at each end of said unit, a plurality of helically wound wire links between the rigid bars, the axes of said links lying parallel thereto, means for connecting adjacent links together, means for connecting the remote links to said rigid bars, a resilient composition encasing said links and bars, and connector means on said bars to connect the same to corresponding links on adjacent units to form an endless track.

7. A track unit for use in an endless track of the type having transversely extending rigid bars positioned at the ends of the unit, a plurality of helically wound wire link means interconnecting the rigid bars together, with the axes of said link means lying parallel to said bars, a body of resilient composition encasing said link means and at least a portion of said bars, and means to connect adjacent units together to form an endless track characterized by the provision of means to prevent relative movement between said links.

8. A track unit for use in an endless track comprising transversely extending rigid bars at each end of said unit, a plurality of helical springs, the axes thereof lying parallel to said bars and in a common plane, and the openings between coils thereof being substantially equal to the size of the wire out of which the springs are formed, the coils of adjacent springs being interengaged, pin means interconnecting adjacent springs for forming hinged connections therebetween, means on said bars for connecting them to remote springs, a resilient composition encasing said links and at least a portion of said bars to form a body, and means on said bars to connect the same to corresponding bars on adjacent units to form an endless track.

9. The device of claim 8 in which said remote springs have a portion adapted to interengage a corresponding portion on adjacent units, and adapted to receive means to form a joint.

10. The device of claim 9 in which said body has means at each end adapted to cooperate with corresponding means on adjacent units to enclose said joint.

11. A track unit for use in an endless track comprising transversely extending rigid bars at each end of said unit, a leg on each bar directed toward the other to define a plane, a plurality of helical springs, means connecting said springs to said bars so that the axes of said springs lie in said plane, and resilient means encasing said springs.

12. A track unit having ends adapted to abut the ends of adjacent like units for forming an endless track comprising, a body of rubber-like composition, and metallic reinforcing contained therewithin including rigid bar means parallel to said ends, a plurality of spiral wires extending the length of said bar means with each of said spiral wires being interleaved with at least one other spiral wire, connector means associated with the interleaved wires for preventing their relative movement in a direction that would move said ends apart, and means for connecting said bar means to said spiral wires.

13. A track unit in accordance with claim 12 having means for preventing relative movement between interleaved wires in a direction that would move said ends together.

14. A track for a track laying vehicle comprising a body of rubber-like composition having longitudinally extending edges defining a tread of given width, and metallic reinforcing contained within said body, said reinforcing including a first rigid bar having end portions, said first bar being transverse to said body with said end portions being substantially adjacent said edges, a first wire helix having end spirals and a plurality of intermediate spirals, means connecting the spirals of said first helix to said first bar so that the axis of said first helix is parallel to said first rigid bar and said end spirals are substantially adjacent said end portions, a second rigid bar having end portions, said second bar being parallel to said first bar with the end portions of said second bar being substantially adjacent said edges, and means connecting the spirals of said first helix to said second bar.

15. The track of claim 14 wherein said last-named means comprise a second wire helix having end spirals and a plurality of intermediate spirals, and means connecting the spirals of said second helix to said second bar so that the axis of said second helix is parallel to said second bar and the end spirals of the second helix are substantially adjacent the end portions of the second bar.

16. A track for a track laying vehicle comprising a body of rubber-like composition having longitudinally extending edges defining a tread of given width, and metallic reinforcing contained within said body, said reinforcing including a plurality of flattened helical springs, each of said springs having end spirals and a plurality of intermediate spirals, each spiral having substantially parallel portions interconnected by U-shaped end portions, said springs being side-by-side with the U-shaped end portions of one spring being interleaved with the U-shaped end portions of an adjacent spring, a pin inserted between interleaved springs for hingedly connecting the same whereby a wire mesh is formed having two terminal springs hingedly connected to intermediate springs, the end spirals of said springs being substantially adjacent said edges, a pair of spaced rigid bars, said bars having end portions substantially adjacent said edges, and means connecting one terminal spring to one bar and connecting the other terminal spring to the other bar.

17. The track of claim 16 wherein spacer plates are inserted within the parallel portions of the spirals of said intermediate springs, and the plate within a given spring contacts the U-shaped end portions of the adjacent interleaved springs.

18. The track of claim 16 wherein spacer plates are inserted within the parallel portions of the spirals of said intermediate springs, said plates being notched on the edges thereof to engage the U-shaped end portions of the adjacent interleaved springs.

19. The device of claim 6 wherein said resilient composition includes portions adjacent each of said rigid bars and said connector means, said portions being adapted to resiliently abut corresponding portions on adjacent units whereby said connector means is enclosed.

20. A track unit having spaced parallel ends adapted to abut ends of adjacent like units for forming an endless track comprising, a body of rubber-like composition, and metallic reinforcing contained therewithin including spaced parallel bar means of substantially equal length at the ends of said track unit, and a wire mesh interconnecting said bar means, said mesh comprising a plurality of helical springs in side-by-side relationship, said springs being parallel to said bar means and substantially as long as said bar means, adjacent springs being interleaved, a connector joining adjacent interleaved springs, each connector forming a hinge between adjacent interleaved springs that effects pivotal movement therebetween, each connector preventing separation of adjacent interleaved springs when said bar means are moved away from each other, and means to connect the springs at each end of the mesh to the bar means at each end.

21. A track unit in accordance with claim 20 wherein plates are inserted within the springs parallel to the bar means, said plates preventing collapse of adjacent interleaved springs when said bar means are moved toward each other.

22. A track in accordance with claim 20 wherein the spacing between coils of the springs is substantially the same as the size of the material of the spring.

23. A track in accordance with claim 22 wherein plates are inserted within the springs parallel to said bar means, said plates having means cooperable with the springs for preventing movement of the plates within the spring, said plates serving to prevent collapse of adjacent interleaved springs when said bar means are moved toward each other.

24. An endless track comprising a plurality of track units, each unit comprising a transversely extending rigid bar positioned at each end of the track unit, a plurality of transversely extending links connecting the bars together, a body of rubber composition encasing said links and at least a portion of the bars, and means on said bars for connecting the same to bars at the ends of adjacent like units, said links comprising helically wound springs with their axes parallel to each of said bars.

25. An endless track comprising a plurality of track units, each unit comprising a transversely extending rigid bar positioned at each end of the track unit, a plurality of transversely extending links connecting the bars together, a body of rubber composition encasing said links and at least a portion of the bars, and means on said bars for connecting the same to bars at the ends of adjacent like units, said links comprising helically wound left-hand and right-hand springs alternatingly arranged with their axes parallel to each of said bars.

26. An endless track comprising a plurality of track units, each unit comprising a transversely extending rigid bar positioned at each end of the track unit, a plurality of links, each of said links extending parallel to the rigid bars at the end of the track unit, means connecting said links to each other and to said rigid bars, a body of rubber composition encasing said links and at least a portion of said rigid bars, and means on said bars for connecting the same to bars at the ends of adjacent like units.

27. The device of claim 26 wherein said links are provided with means to prevent relative movement between said links in a direction parallel to the longitudinal axis of the track.

References Cited in the file of this patent

UNITED STATES PATENTS

| | | |
|---|---|---|
| 208,198 | Pickhardt | Sept. 17, 1878 |
| 432,804 | Midgley | July 22, 1890 |
| 1,693,833 | Worley | Dec. 4, 1928 |
| 2,244,422 | Guba | June 3, 1941 |
| 2,332,313 | Galanot | Oct. 19, 1943 |
| 2,338,550 | Sloman et al. | Jan. 4, 1944 |
| 2,410,507 | Knight | Nov. 5, 1946 |
| 2,452,752 | Hartranft | Nov. 2, 1948 |
| 2,516,115 | Hagenbuch et al. | July 25, 1950 |
| 2,575,813 | Hutchins | Nov. 20, 1951 |
| 2,770,402 | Quam | Nov. 13, 1956 |
| 2,796,302 | Atkinson | June 18, 1957 |

FOREIGN PATENTS

| | | |
|---|---|---|
| 1,146,925 | France | May 27, 1957 |